(12) United States Patent
Yamamoto

(10) Patent No.: US 11,904,481 B2
(45) Date of Patent: Feb. 20, 2024

(54) REMOTE CONTROL SYSTEM AND REMOTE CONTROL METHOD

(71) Applicant: TOYOTA JIDOSHA KABUSHIKI KAISHA, Toyota (JP)

(72) Inventor: Takashi Yamamoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 307 days.

(21) Appl. No.: 17/088,233

(22) Filed: Nov. 3, 2020

(65) Prior Publication Data

US 2021/0178598 A1 Jun. 17, 2021

(30) Foreign Application Priority Data

Dec. 13, 2019 (JP) ................................ 2019-225287

(51) Int. Cl.
*B25J 9/16* (2006.01)
*B25J 19/02* (2006.01)

(52) U.S. Cl.
CPC ............. *B25J 9/1689* (2013.01); *B25J 9/163* (2013.01); *B25J 9/1669* (2013.01); *B25J 19/023* (2013.01)

(58) Field of Classification Search
None
See application file for complete search history.

(56) References Cited

U.S. PATENT DOCUMENTS

| 2011/0010009 A1 | 1/2011 | Saito |
| 2013/0238131 A1 | 9/2013 | Kondo et al. |
| 2015/0190925 A1* | 7/2015 | Hoffman ............ B25J 9/161 901/47 |
| 2016/0167228 A1* | 6/2016 | Wellman ............ B25J 9/1602 901/3 |
| 2019/0184554 A1 | 6/2019 | Yamazaki et al. |
| 2019/0366548 A1 | 12/2019 | Hasegawa et al. |

FOREIGN PATENT DOCUMENTS

| EP | 2 263 837 A1 | 12/2010 |
| JP | 2010-264553 A | 11/2010 |
| JP | 2013-184257 A | 9/2013 |
| JP | 5326794 B2 | 10/2013 |
| JP | 2018-118343 A | 8/2018 |
| KR | 10-2010-0084663 A | 7/2010 |
| KR | 10-2013-0032990 A | 4/2013 |
| KR | 10-2019-0073282 A | 6/2019 |
| KR | 10-2019-0136962 A | 12/2019 |

* cited by examiner

*Primary Examiner* — Jeff A Burke
*Assistant Examiner* — Arslan Azhar
(74) *Attorney, Agent, or Firm* — Oliff PLC

(57) ABSTRACT

A remote control system includes: an imaging unit that shoots an environment in which a device to be operated including an end effector is located; a recognition unit that recognizes objects that can be grasped by the end effector based on a shot image of the environment shot by the imaging unit; an operation terminal that displays the shot image and receive handwritten input information input to the displayed shot image; and an estimation unit that, based on the objects that can be grasped and the handwritten input information input to the shot image, estimates an object to be grasped which has been requested to be grasped by the end effector from among the objects that can be grasped and estimates a way of performing a grasping motion by the end effector, the grasping motion having been requested to be performed with regard to the object to be grasped.

5 Claims, 17 Drawing Sheets

| HANDWRITTEN INPUT INFORMATION (IMAGE) | | | | HANDWRITTEN INPUT INFORMATION (MEANING) |
|---|---|---|---|---|
| ◇ | ◠ | ╱ | | HOLD SOMETHING |
| ⋎ | ⋎↓ | ◡ OPEN | ◠ OPENING | OPEN SOMETHING |
| ⋮ | | | | ⋮ |

Fig. 11

| HANDWRITTEN INPUT INFORMATION (IMAGE) | HANDWRITTEN INPUT INFORMATION (MEANING) |
|---|---|
| ⊓ ∩ ∧ | HOLD FROM ABOVE |
| ⊐ ⊃ > | HOLD FROM SIDE |
| ◇ ◡ ⁄| | HOLD FROM DIAGONALLY ABOVE |
| ⋮ | ⋮ |

Fig. 12

REMOTE CONTROL SYSTEM AND REMOTE CONTROL METHOD

CROSS REFERENCE TO RELATED APPLICATIONS

This application is based upon and claims the benefit of priority from Japanese patent application No. 2019-225287, filed on Dec. 13, 2019, the disclosure of which is incorporated herein in its entirety by reference.

BACKGROUND

The present disclosure relates to a remote control system and a remote control method.

A technique is known in which a user remotely operates a device to be operated including an end effector, such as a robot or the like including a grasping part (e.g., a hand or a suction part) at the tip of its arm as an end effector, to thereby cause the device to be operated to perform a grasping motion or the like. For example, Japanese Patent No. 5326794 discloses a technique for displaying a shot image obtained by shooting the periphery of a robot and then estimating a content of an operation to be performed by the robot based on an instruction input to the shot image by a user by handwriting.

SUMMARY

However, the technique disclosed in Japanese Patent No. 5326794 is a technique for remotely controlling a robot by inputting predetermined instruction figures (o, x, Δ, etc.) by handwriting. Therefore, it has recently been desired to remotely control a device to be operated by a more intuitive operation.

The present disclosure has been made to solve the above-described problem, and it provides a remote control system and a remote control method that enable a more intuitive operation.

A first exemplary aspect is a remote control system configured to remotely control a device to be operated including an end effector, the remote control system including:
an imaging unit configured to shoot an environment in which the device to be operated is located;
a recognition unit configured to recognize objects that can be grasped by the end effector based on a shot image of the environment shot by the imaging unit;
an operation terminal configured to display the shot image and receive handwritten input information input to the displayed shot image; and
an estimation unit configured to, based on the objects that can be grasped which the recognition unit has recognized and the handwritten input information input to the shot image, estimate an object to be grasped which has been requested to be grasped by the end effector from among the objects that can be grasped and estimate a way of performing a grasping motion by the end effector, the grasping motion having been requested to be performed with regard to the object to be grasped.

Another exemplary aspect is a remote control method performed by a remote control system configured to remotely control a device to be operated including an end effector, the remote control method including:
shooting an environment in which the device to be operated is located;
receiving, by an operation terminal displaying a shot image of the environment, handwritten input information input to the displayed shot image;
recognizing objects that can be grasped by the end effector based on the shot image; and
based on the objects that can be grasped and the handwritten input information input to the shot image, estimating an object to be grasped which has been requested to be grasped by the end effector from among the objects that can be grasped and estimating a way of performing a grasping motion by the end effector, the grasping motion having been requested to be performed with regard to the object to be grasped.

According to the above-described aspects of the present disclosure, it is possible to provide a remote control system and a remote control method that enable a more intuitive operation.

The above and other objects, features and advantages of the present disclosure will become more fully understood from the detailed description given hereinbelow and the accompanying drawings which are given by way of illustration only, and thus are not to be considered as limiting the present disclosure.

BRIEF DESCRIPTION OF DRAWINGS

FIG. 11 shows an example of teaching data for a second learned model;

FIG. 12 shows an example of teaching data for the second learned model;

DESCRIPTION OF EMBODIMENTS

Hereinafter, although the present disclosure will be described with reference to embodiment of the present disclosure, the present disclosure according to claims is not limited to the following embodiment. Further, all the components described in the following embodiment are not necessarily essential as means for solving problems. Further, in the following embodiment, a robot including a hand at the tip of its arm as an end effector will be described as an example of a device to be operated, but the device to be operated is not limited thereto.

Figure 1:
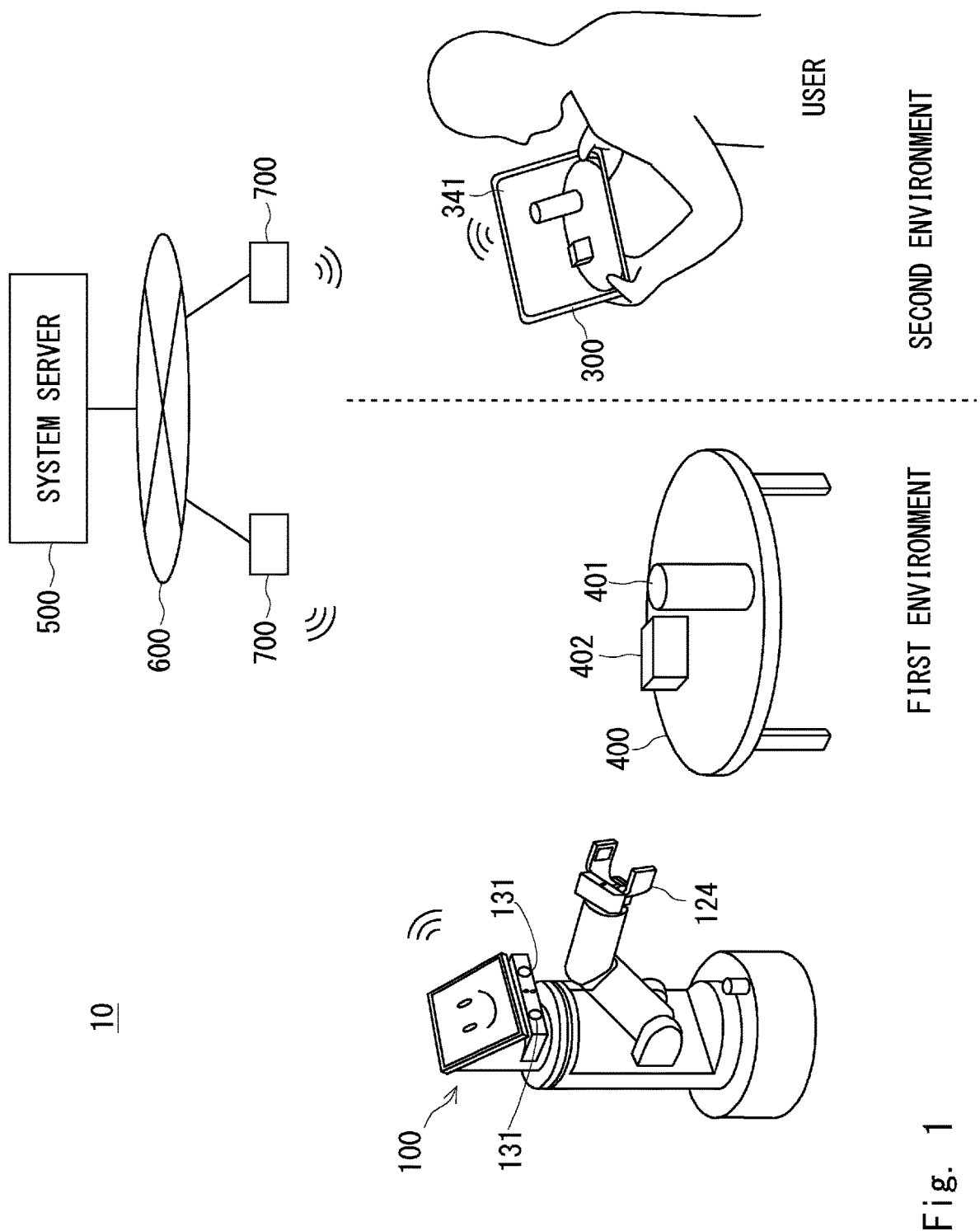
FIG. 1 is a conceptual diagram showing an example of an overall environment in which a remote control system according to an embodiment is used.

FIG. 1 is a conceptual diagram showing an example of an overall environment in which a remote control system 10 according to this embodiment is used. A robot 100 that performs various kinds of motions in a first environment is remotely controlled via a system server 500 connected to an Internet 600 by allowing a user who is a remote operator present in a second environment distant from the first environment to operate a remote terminal 300 (an operation terminal). In the first environment, the robot 100 is connected to the Internet 600 via a wireless router 700. Further, in the second environment, the remote terminal 300 is connected to the Internet 600 via the wireless router 700. The system server 500 is connected to the Internet 600. The robot 100 performs a grasping motion or the like by a hand 124 in accordance with an operation of the remote terminal 300 by the user.

Note that in this embodiment, grasping motions performed by the hand 124 are not limited to motions for simply grasping (holding) an object to be grasped, but also include, for example, the following motions.

- a motion for holding and lifting an object to be grasped
- a motion for, when an object to be grasped is a knob for a door or a drawer of a cabinet or the like, holding the knob and then opening and closing the door or the drawer
- a motion for, when an object to be grasped is a door knob of a door, holding the door knob and then opening and closing the door The robot 100 shoots the first environment in which the robot 100 is located by a stereo camera 131 (an imaging unit), and transmits the shot image to the remote terminal 300 via the Internet 600. Further, the robot 100 recognizes objects that can be grasped by the hand 124 based on the shot image.

Figure 2:
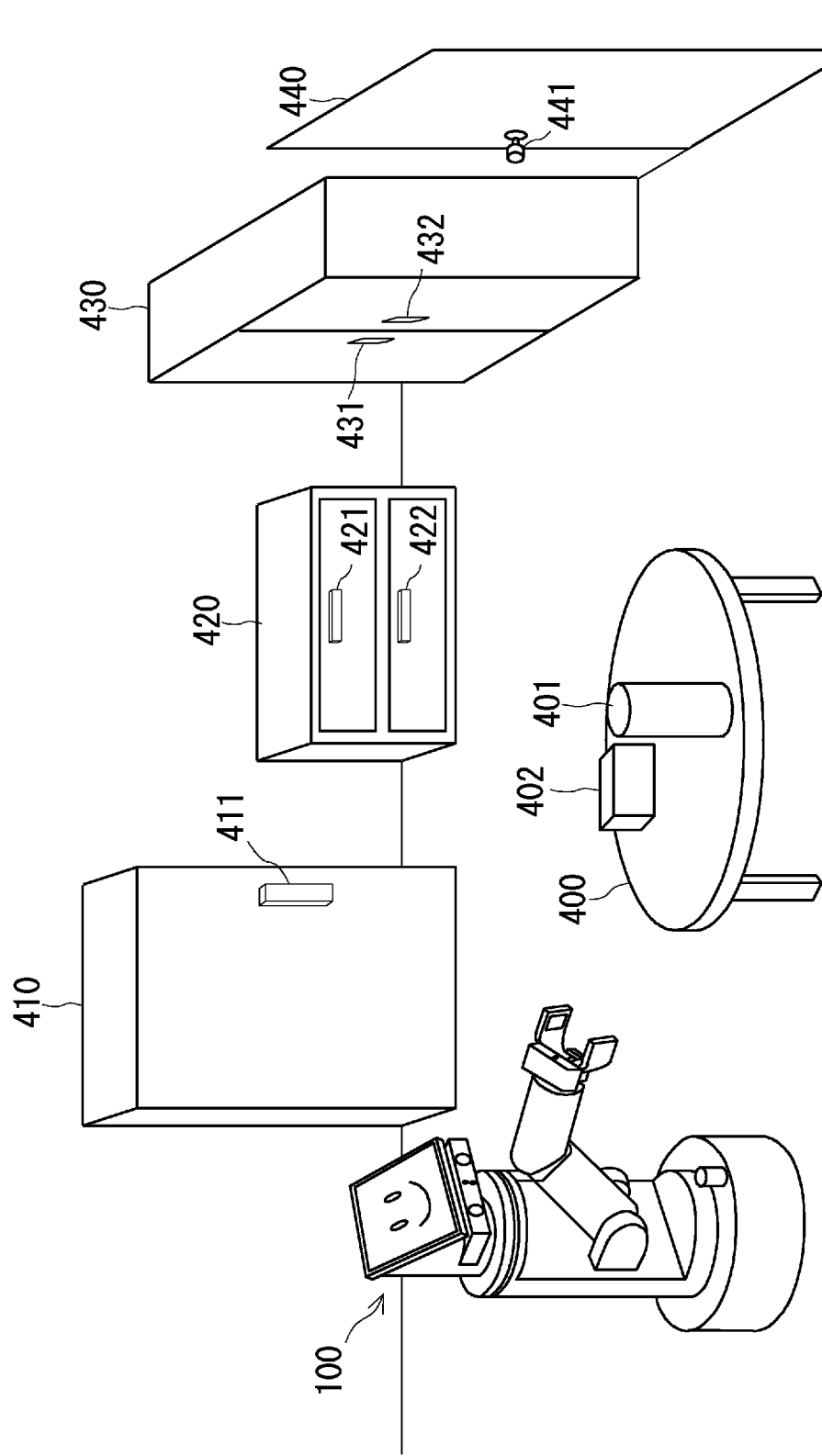
FIG. 2 shows an example of a first environment in which a robot is located.

FIG. 2 shows an example of a first environment in which the robot 100 is located. In the example shown in FIG. 2, a table 400, cabinets 410, 420, and 430, and a door 440 are located in the first environment. The objects that can be grasped located in the first environment are objects 401 and 402 placed on the table 400, a knob 411 of the cabinet 410, knobs 421 and 422 of the cabinet 420, knobs 431 and 432 of the cabinet 430, and a door knob 441 of the door 440.

Figure 4:
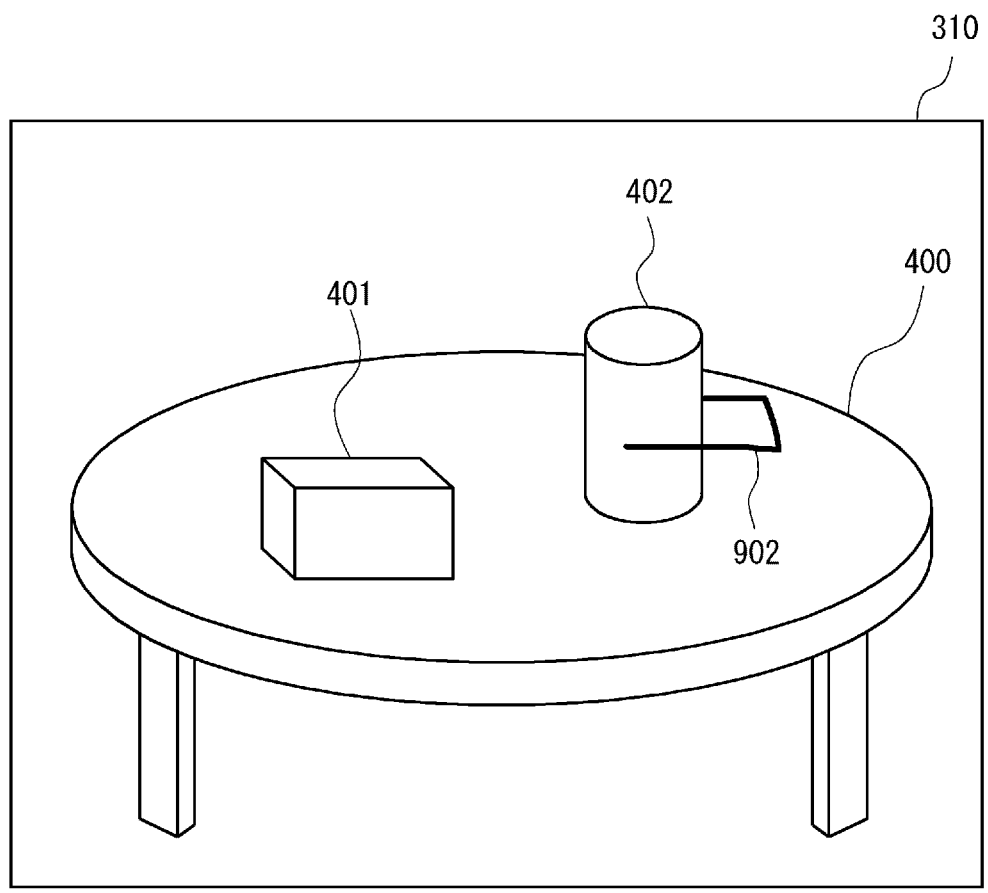
FIG. 4 shows an example of handwritten input information.
Figure 5:
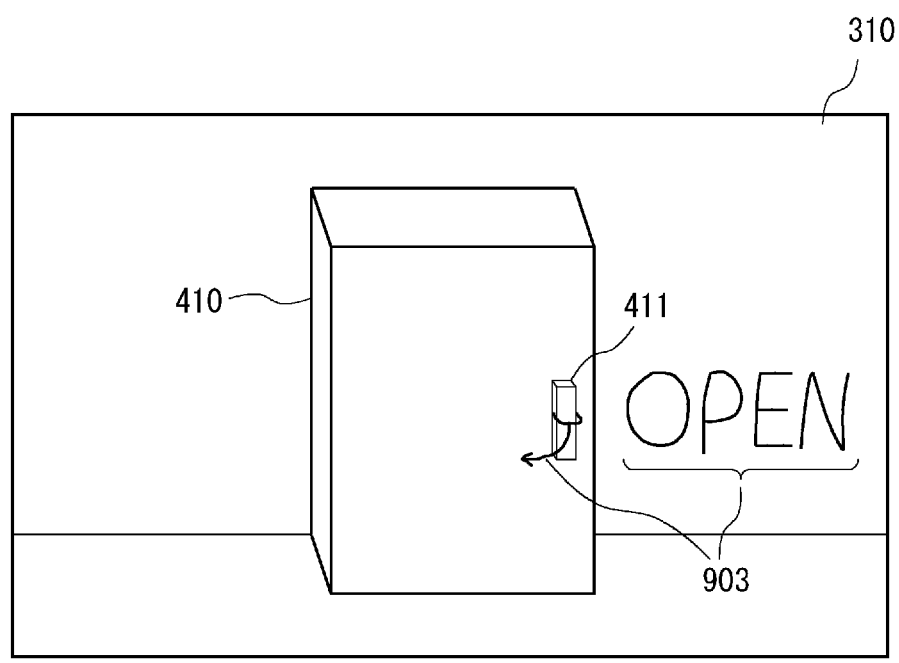
FIG. 5 shows an example of handwritten input information.

The remote terminal 300 is, for example, a tablet terminal, and includes a display panel 341 on which a touch panel is superimposed. The shot image received from the robot 100 is displayed on the display panel 341, and thus a user can indirectly view the first environment in which the robot 100 is located. Further, a user can input handwritten input information, which is an image (a first image) that simulates a way of grasping the object to be grasped which has been requested to be grasped by the hand 124, to the shot image displayed on the display panel 341 by handwriting. As a method for inputting the handwritten input information, for example, a method in which the relevant part of the shot image on a touch panel disposed so as to be superimposed on the display panel 341 is touched with a finger of a user, a touch pen, or the like can be used, but the method therefor is not limited to this. Each of FIGS. 3 to 5 shows an example of handwritten input information input to a shot image 310.

Figure 3:
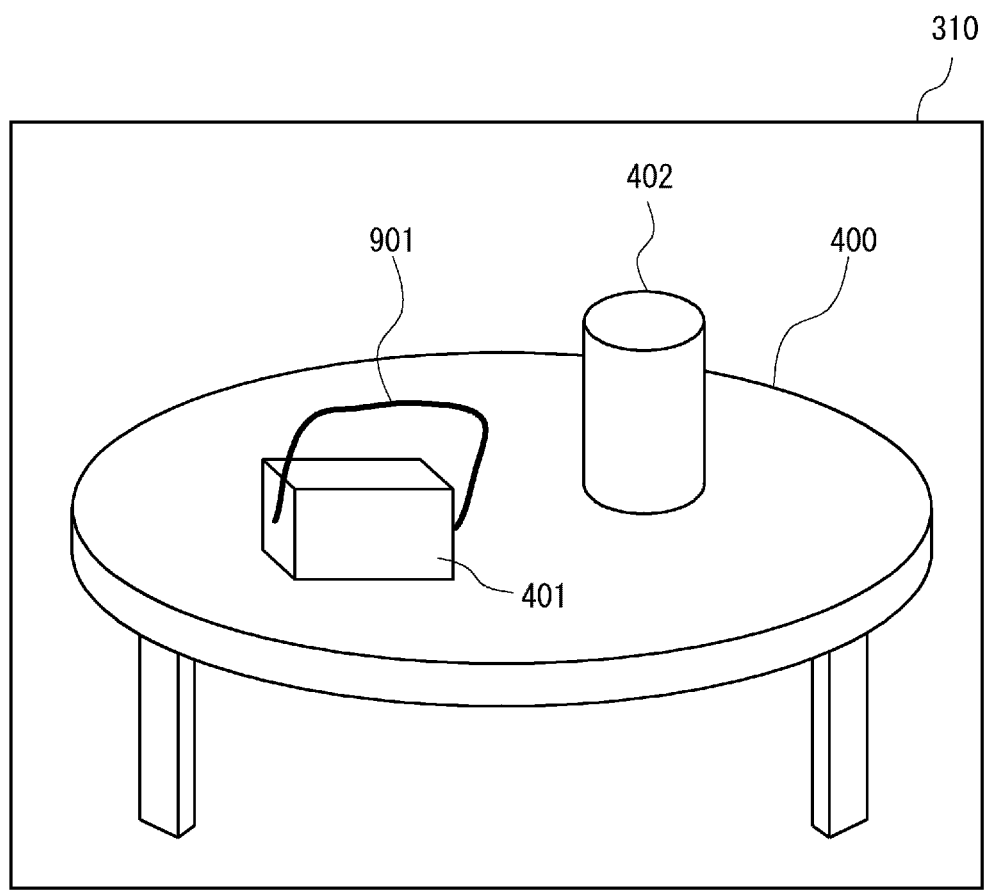
FIG. 3 shows an example of handwritten input information.

The example shown in FIG. 3 shows handwritten input information 901 that simulates grasping the object 401 having a rectangular parallelepiped shape placed on the table 400 from above. The example of FIG. 4 shows handwritten input information 902 that simulates grasping the object 402 having a columnar shape placed on the table 400 from the side. The example of FIG. 5 shows handwritten input information 903 that simulates grasping the knob 411 of the cabinet 410 and then opening the door. As shown in FIGS. 3 to 5, the image of the handwritten input information may be an image consisting of only figures such as lines, or an image consisting of a combination of figures such as lines and characters. The handwritten input information which a user has input to the shot image is transmitted to the robot 100 via the Internet 600.

The robot 100, based on objects that can be grasped which have been recognized from a shot image and handwritten input information which a user has input to the shot image, estimates an object to be grasped which has been requested to be grasped by the hand 124 from among the objects that can be grasped and estimates a way of performing a grasping motion by the hand 124, the grasping motion having been requested to be performed with regard to the object to be grasped.

Figure 6:
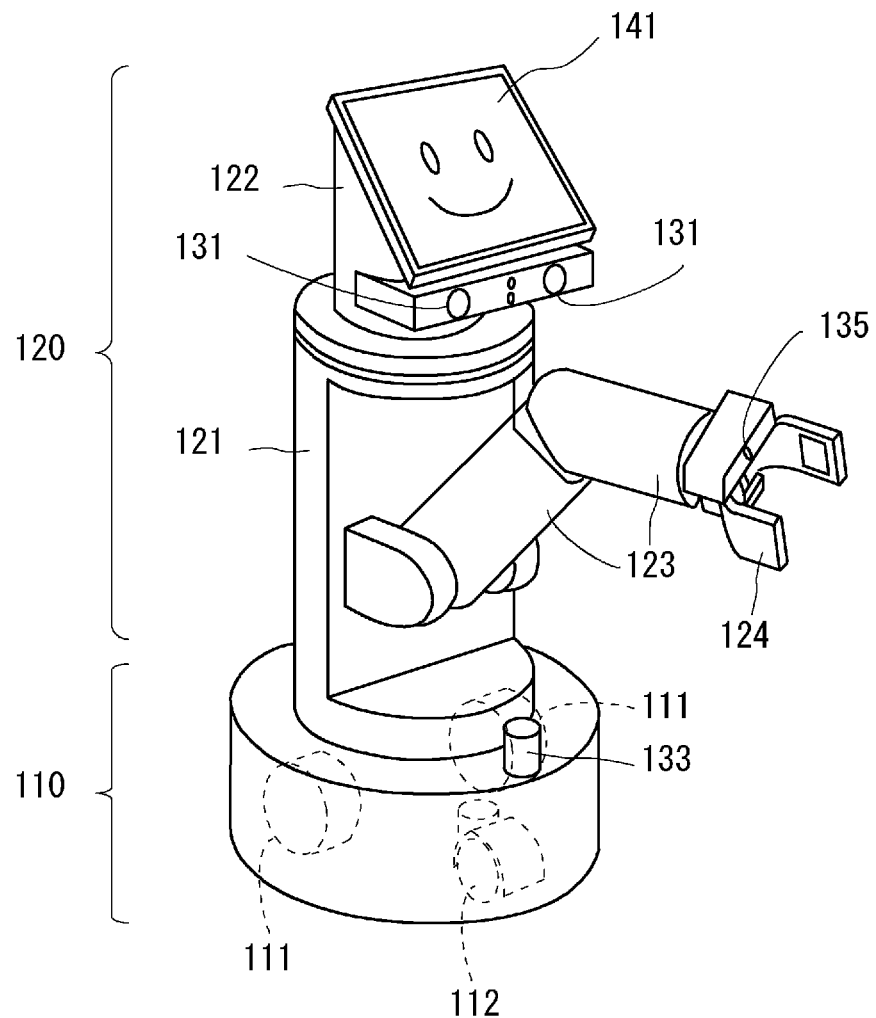
FIG. 6 is an external perspective view showing an example of an external configuration of a robot.

FIG. 6 is an external perspective view showing an example of an external configuration of the robot 100. The robot 100 includes, mainly, a movable base part 110 and a main-body part 120. The movable base part 110 supports two driving wheels 111 and a caster 112, each of which is in contact with a traveling surface, inside its cylindrical housing. The two driving wheels 111 are arranged so that the centers of their rotation axes coincide with each other. Each of the driving wheels 111 is rotationally driven by a motor (not shown) independently of each other. The caster 112 is a driven wheel and is disposed so that its pivotal axis extending from the movable base part 110 in the vertical direction axially supports the wheel at a place away from its rotation axis. Further, the caster 112 follows the movement of the movable base part 110 so as to move in the moving direction of the movable base part 110.

The movable base part 110 includes a laser scanner 133 in a peripheral part of its top surface. The laser scanner 133 scans a certain range on the horizontal plane at intervals of a certain stepping angle and outputs information as to whether or not there is an obstacle in each direction. Further, when there is an obstacle, the laser scanner 133 outputs a distance to the obstacle.

The main-body part 120 includes, mainly, a body part 121 mounted on the top surface of the movable base part 110, a head part 122 placed on the top surface of the body part 121, an arm 123 supported on the side surface of the body part 121, and the hand 124 disposed at the tip of the arm 123. The arm 123 and the hand 124 are driven by motors (not shown) and grasp an object to be grasped. The body part 121 is able to rotate around a vertical axis with respect to the movable base part 110 by a driving force of a motor (not shown).

The head part 122 mainly includes the stereo camera 131 and a display panel 141. The stereo camera 131 has a configuration in which two camera units having the same angle of view are arranged away from each other, and outputs imaging signals of images shot by the respective camera units.

The display panel 141 is, for example, a liquid crystal display panel, and displays an animated face of a pre-defined character and displays information about the robot 100 in the form of text or by using icons. By displaying the face of the character on the display panel 141, it is possible to impart an impression that the display panel 141 is a pseudo face part to people around the robot 100.

The head part 122 is able to rotate around a vertical axis with respect to the body part 121 by a driving force of a motor (not shown). Thus, the stereo camera 131 can shoot an image in any direction. Further, the display panel 141 can show displayed contents in any direction.

Figure 7:
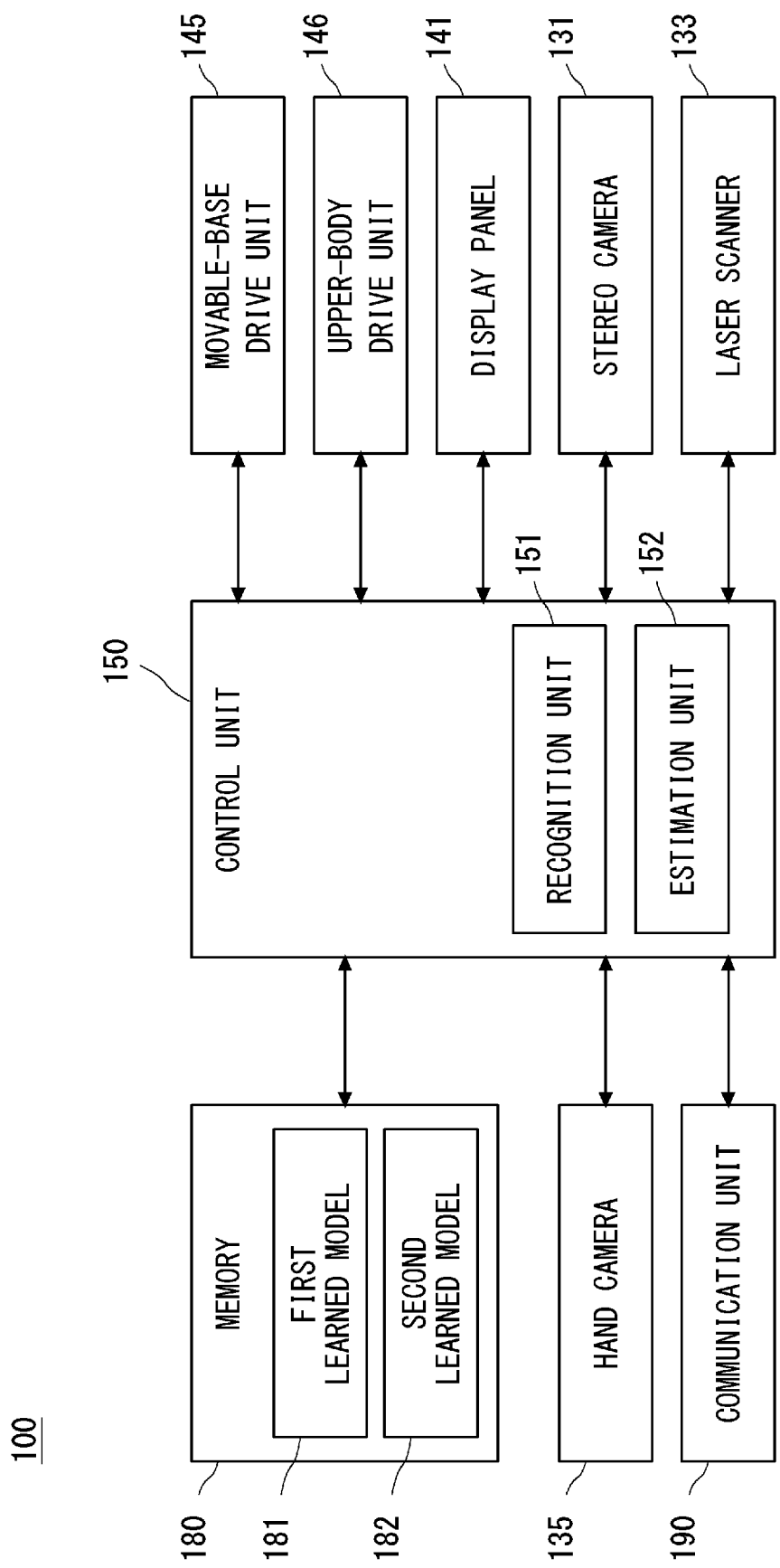
FIG. 7 is a block diagram showing an example of a block configuration of the robot.

FIG. 7 is a block diagram showing an example of a block configuration of the robot 100. Main elements related to an estimation of an object to be grasped and an estimation of a way of performing a grasping motion will be described below. However, the robot 100 includes elements in its configuration other than the above ones and may include additional elements that contribute to the estimation of an object to be grasped and the estimation of a way of performing a grasping motion.

A control unit 150 is, for example, a CPU (Central Processing Unit) and is included in, for example, a control box disposed in the body part 121. A movable-base drive unit 145 includes the driving wheels 111, and a driving circuit and motors for driving the driving wheels 111. The control unit 150 performs rotation control of the driving wheels by sending a driving signal to the movable-base drive unit 145. Further, the control unit 150 receives a feedback signal such as an encoder signal from the movable-base drive unit 145 and recognizes a moving direction and a moving speed of the movable base part 110.

An upper-body drive unit 146 includes the arm 123 and the hand 124, the body part 121, the head part 122, and driving circuits and motors for driving these components. The control unit 150 performs a grasping motion and a gesture by transmitting a driving signal to the upper-body drive unit 146. Further, the control unit 150 receives a feedback signal such as an encoder signal from the upper-body drive unit 146, and recognizes positions and moving speeds of the arm 123 and the hand 124, and orientations and rotation speeds of the body part 121 and the head part 122.

The display panel 141 receives an image signal generated by the control unit 150 and displays an image thereof. Further, as described above, the control unit 150 generates an image signal of the character or the like and displays an image thereof on the display panel 141.

The stereo camera 131 shoots the first environment in which the robot 100 is located in accordance with a request from the control unit 150 and passes an obtained imaging signal to the control unit 150. The control unit 150 performs image processing by using the imaging signal and converts the imaging signal into a shot image in a predetermined format. The laser scanner 133 detects whether there is an obstacle in the moving direction of the robot 100 in accordance with a request from the control unit 150 and passes a detection signal, which is a result of the detection, to the control unit 150.

A hand camera 135 is, for example, a distance image sensor, and is used to recognize a distance to an object to be grasped, a shape of an object to be grasped, a direction of an object to be grasped, and the like. The hand camera 135 includes an image pickup device in which pixels for performing a photoelectrical conversion of an optical image incident from a target space are two-dimensionally arranged, and outputs a distance to the subject to the control unit 150 for each of the pixels. Specifically, the hand camera 135 includes an irradiation unit that irradiates a pattern light to the target space, and receives the reflected light of the pattern light by the image pickup device to output a distance to the subject captured by each of the pixels based on a distortion and a size of the pattern in the image. Note that the control unit 150 recognizes a state of a wider surrounding environment by the stereo camera 131 and recognizes a state in the vicinity of the object to be grasped by the hand camera 135.

A memory 180 is a nonvolatile storage medium. For example, a solid-state drive is used for the memory 180. The memory 180 stores, in addition to a control program for controlling the robot 100, various parameter values, functions, lookup tables, and the like used for the control and the calculation. In particular, the memory 180 stores a first learned model 181 that uses a shot image as an input image and outputs objects that can be grasped shown in the shot image, and a second learned model 182 that uses handwritten input information as an input image and outputs the meaning of a grasping motion simulated by the handwritten input information.

A communication unit 190 is, for example, a wireless LAN unit and performs radio communication with the wireless router 700. The communication unit 190 receives the handwritten input information sent from the remote terminal 300 and passes it to the control unit 150. Further, the communication unit 190 transmits a shot image shot by the stereo camera 131 to the remote terminal 300 under the control of the control unit 150.

The control unit 150 performs control of the whole robot 100 and various calculation processes by executing a control program read from the memory 180. Further, the control unit 150 also serves as a function execution unit that executes various calculations and controls related to the control. As such function execution units, the control unit 150 includes a recognition unit 151 and an estimation unit 152.

The recognition unit 151 uses a shot image shot by one of the camera units of the stereo camera 131 as an input image, obtains areas that can be grasped by the hand 124 shown in the shot image from the first learned model 181 read from the memory 180, and recognizes objects that can be grasped.

Figure 8:
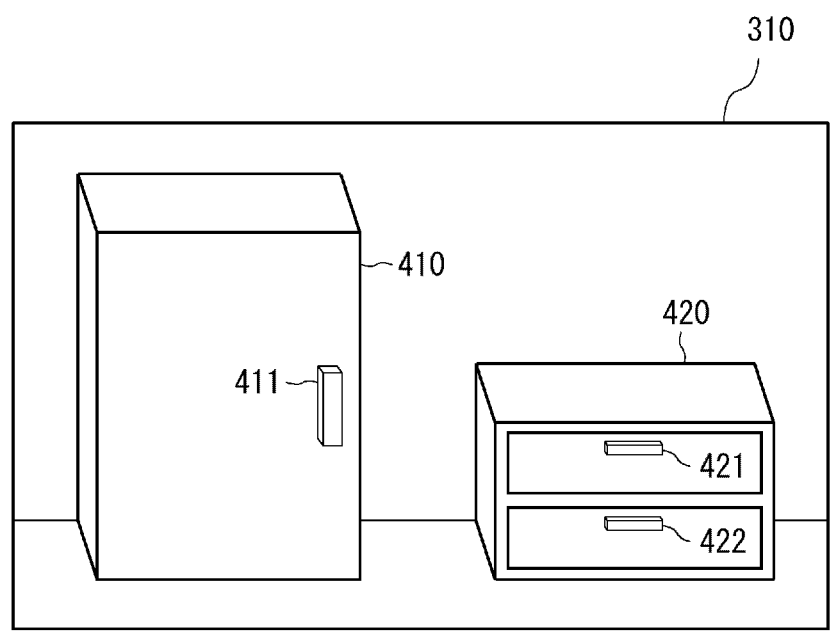
FIG. 8 shows an example of a shot image acquired by the robot.

FIG. 8 is a diagram showing an example of the shot image 310 of the first environment which the robot 100 has acquired by the stereo camera 131. The shot image 310 in FIG. 8 shows the cabinet 410 having the knob 411 and the cabinet 420 having the knobs 421 and 422. The recognition unit 151 provides the shot image 310 described above to the first learned model 181 as an input image.

Figure 9:
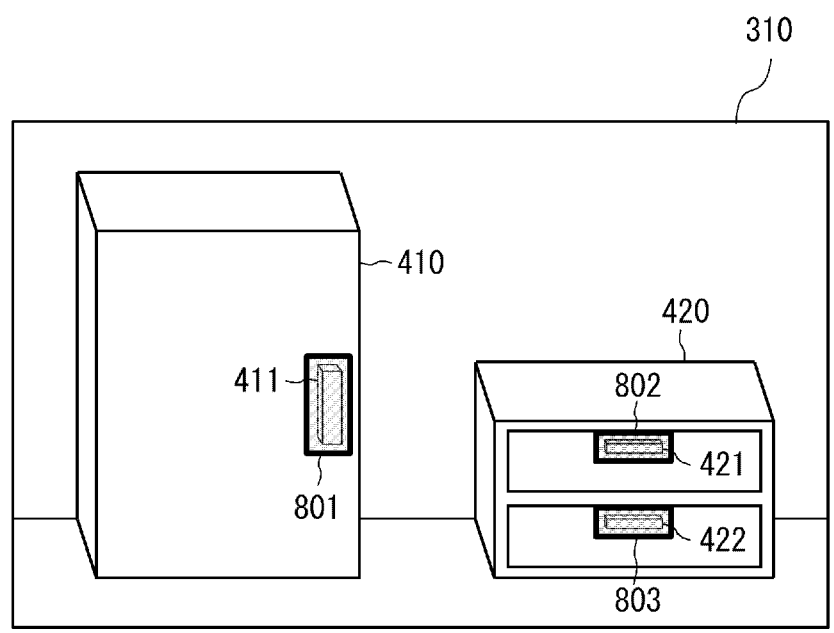
FIG. 9 shows an example of an area that can be grasped which a first learned model outputs.

FIG. 9 is a diagram showing an example of the areas that can be grasped output by the first learned model 181 when the shot image 310 shown in FIG. 8 is used as an input image. Specifically, an area that surrounds the knob 411 is detected as an area 801 that can be grasped, an area that surrounds the knob 421 is detected as an area 802 that can be grasped, and an area that surrounds knob 422 is detected as an area 803 that can be grasped. Thus, the recognition unit 151 recognizes each of the knobs 411, 421, and 422, which are surrounded by the respective areas 801, 802, and 803 that can be grasped, as an object that can be grasped.

The first learned model 181 is a neural network learned from teaching data which is a combination of an image showing objects that can be grasped by the hand 124 and a correct answer to which area of the image is the object that can be grasped. At this time, by preparing the teaching data so that it further indicates the distances to the objects that can be grasped and the directions in which the objects that can be grasped are located shown in the image, the first learned model 181, which uses the shot image as an input image, can output not only the objects that can be grasped but also the distances to the objects that can be grasped and the directions in which the objects that can be grasped are located. Note that the first learned model 181 may be a neural network learned by deep learning. Further, teaching data may be added to the first learned model 181 as necessary so that it performs additional learning.

The estimation unit 152, based on objects that can be grasped which the recognition unit 151 has recognized from a shot image and handwritten input information which a user has input to the shot image, estimates an object to be grasped which has been requested to be grasped by the hand 124 from among the objects that can be grasped which the recognition unit 151 has recognized and estimate a way of performing a grasping motion by the hand 124, the grasping motion having been requested to be performed with regard to the estimated object to be grasped.

Figure 10:
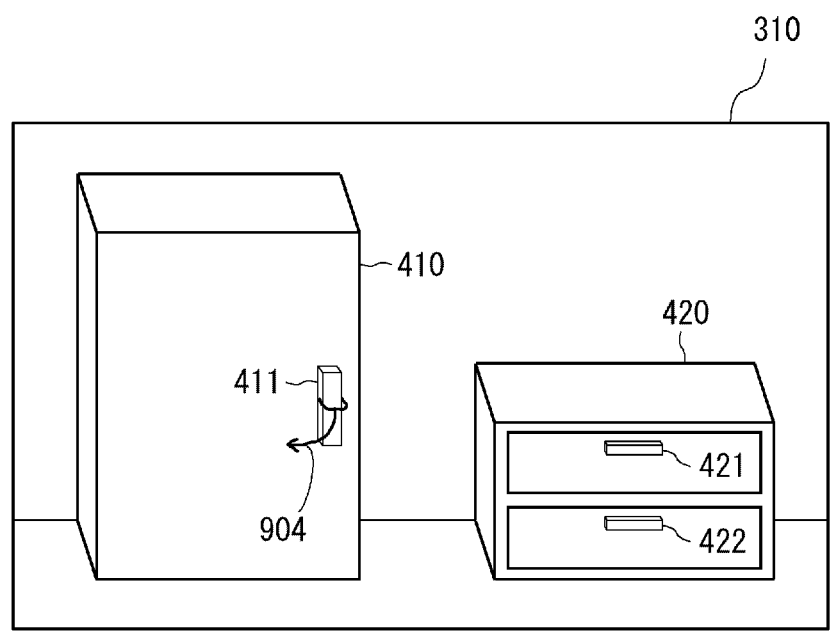
FIG. 10 shows an example of handwritten input information.

FIG. 10 is a diagram showing an example of handwritten input information which a user has input to the shot image 310 of FIG. 8 in the remote terminal 300. In the example shown in FIG. 10, handwritten input information 904 is input to a position on the knob 411 on the shot image 310. Therefore, the estimation unit 152 estimates that the object to be grasped which has been requested to be grasped by the hand 124 is the knob 411 among the knobs 411, 421, and 422 which the recognition unit 151 has recognized as the objects that can be grasped. Note that the estimation unit 152 can recognize the input position of the handwritten input information 904 on the shot image 310 by any method. For example, if the remote terminal 300 includes, in the handwritten input information 904, position information indicating the input position of the handwritten input information 904 on the shot image 310 and transmit this handwritten input information 904, the estimation unit 152 can recognize the input position of the handwritten input information 904 based on this position information.

Alternatively, if the remote terminal 300 transmits the shot image 310 processed into a state in which the handwritten input information 904 has been input, the estimation unit 152 can recognize the input position of the handwritten input information 904 based on this shot image 310.

Further, the estimation unit 152 uses an image of handwritten input information which a user has input to the shot image as an input image, obtains the meaning of a grasping motion simulated by this handwritten input information from the second learned model 182 read from the memory 180, and estimates a way of performing a grasping motion by the hand 124, the grasping motion having been requested to be performed with regard to the object to be grasped.

The second learned model 182 is a neural network learned from teaching data which is a combination of an image of handwritten input information and the meaning of a grasping motion simulated by this handwritten input information. FIG. 11 shows an example of teaching data for the second learned model 182. The example of the teaching data shown in FIG. 11 is teaching data for making the second learned model 182 learn three images indicating a grasping motion of "holding something" and four images indicating a grasping motion of "opening something". Further, the second learned model 182 may be made to learn more detailed teaching data than the teaching data shown in FIG. 11. FIG. 12 is a diagram showing an example of teaching data for making the second learned model 182 learn in more detail a grasping motion of "holding something". The example of the teaching data shown in FIG. 12 is teaching data for making the second learned model 182 learn an image indicating a grasping motion of "holding something from above", an image indicating a grasping motion of "holding something from the side", and an image indicating a grasping motion of "holding something from diagonally above". Note that the second learned model 182 may be a neural network learned by deep learning. Further, teaching data may be added to the second learned model 182 as necessary so that it performs additional learning.

In the example shown in FIG. 10, the estimation unit 152 recognizes from the second learned model 182 that the handwritten input information 904 means a grasping motion of "opening something". Therefore, the estimation unit 152 estimates that the grasping motion which has been requested to be performed with regard to the knob 411, which is the object to be grasped, is a motion of holding the knob 411 and then opening the door.

As described above, the estimation unit 152 can estimate an object to be grasped which has been requested to be grasped by the hand 124 and a way of performing a grasping motion by the hand 124, the grasping motion having been requested to be performed with regard to the object to be grasped. Further, depending on the first learned model 181, it is possible to obtain the distance to the object to be grasped and the direction in which the object to be grasped is located from the shot image acquired by the stereo camera 131. Note that the distance to the object to be grasped and the direction in which the object to be grasped is located may be obtained by performing an image analysis on the shot image of the first environment or from information received from other sensors. Further, it is also possible to detect whether there are obstacles in the moving direction of the robot 100 by a detection signal received from the laser scanner 133.

Therefore, the control unit 150 generates, based on the distance to the object to be grasped, the direction in which the object to be grasped is located, the presence or absence of obstacles, and the like, a route for the robot 100 to move from its current position to the vicinity of the object to be grasped while avoiding obstacles, and transmits a driving signal corresponding to the generated route to the movable-base drive unit 145. The movable-base drive unit 145 moves the robot 100 to the vicinity of the object to be grasped in response to the driving signal.

When the robot 100 has been moved to the vicinity of the object to be grasped, the control unit 150 makes preparations to start performing a grasping motion by the hand 124, the grasping motion having been requested to be performed with regard to the object to be grasped. Specifically, first, the control unit 150 drives the arm 123 to a position where the hand camera 135 can observe an object to be grasped. Next, the control unit 150 causes the hand camera 135 to shoot the object to be grasped and thus recognizes the state of the object to be grasped.

Then, the control unit 150 generates a trajectory of the hand 124 for enabling a grasping motion that has been requested to be performed with regard to the object to be grasped based on the state of the object to be grasped and a way of performing the grasping motion by the hand 124. At this time, the control unit 150 generates a trajectory of the hand 124 so that it satisfies predetermined grasping conditions. The predetermined grasping conditions include the condition at the time when the hand 124 grasps the object to be grasped, condition of the trajectory of the hand 124 until the hand 124 grasps the object to be grasped, and the like. Examples of the conditions at the time when the hand 124 grasps the object to be grasped include that the arm 123 is prevented from extending too much when the hand 124 grasps the object to be grasped. Further, examples of the conditions of the trajectory of the hand 124 until the hand 124 grasps the object to be grasped include that the hand 124 describes a straight trajectory when the object to be grasped is a knob for a drawer.

When the control unit 150 generates a trajectory of the hand 124, it transmits a driving signal corresponding to the generated trajectory to the upper-body drive unit 146. The hand 124 performs a grasping motion with regard to the object to be grasped in response to the driving signal.

Figure 13:
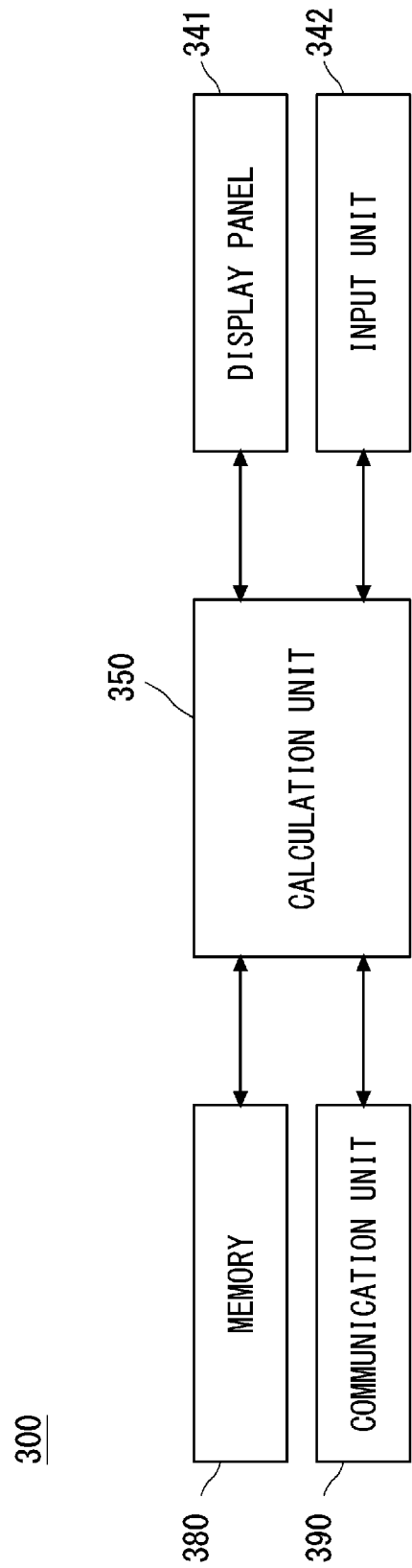
FIG. 13 is a block diagram showing an example of a block configuration of a remote terminal.

FIG. 13 is a block diagram showing an example of a block configuration of the remote terminal 300. Main elements related to a process for inputting handwritten input information to a shot image received from the robot 100 will be described below. However, the remote terminal 300 includes elements in its configuration other than the above ones and may include additional elements that contribute to the process for inputting handwritten input information.

A calculation unit 350 is, for example, a CPU and performs control of the whole remote terminal 300 and various calculation processes by executing a control program read from a memory 380. The display panel 341 is, for example, a liquid crystal panel, and displays, for example, a shot image sent from the robot 100.

An input unit 342 includes a touch panel disposed so as to be superimposed on the display panel 141 and a push button provided on a peripheral part of the display panel 141. The input unit 342 passes, to the calculation unit 350, the handwritten input information, which is an image that simulates a way of performing a grasping motion by hand 124, the grasping motion having been requested to be performed with regard to the object to be grasped, and which a user has input by touching the touch panel. Examples of the handwritten input information are as shown in FIGS. 3 to 5.

The memory 380 is a nonvolatile storage medium. For example, a solid-state drive is used for the memory 380. The memory 380 stores, in addition to a control program for controlling the remote terminal 300, various parameter values, functions, lookup tables, and the like used for the control and the calculation.

A communication unit 390 is, for example, a wireless LAN unit and performs radio communication with the wireless router 700. The communication unit 390 receives the shot image sent from the robot 100 and passes it to the calculation unit 350. Further, the communication unit 390 cooperates with the calculation unit 350 to transmit handwritten input information to the robot 100.

Figure 14:
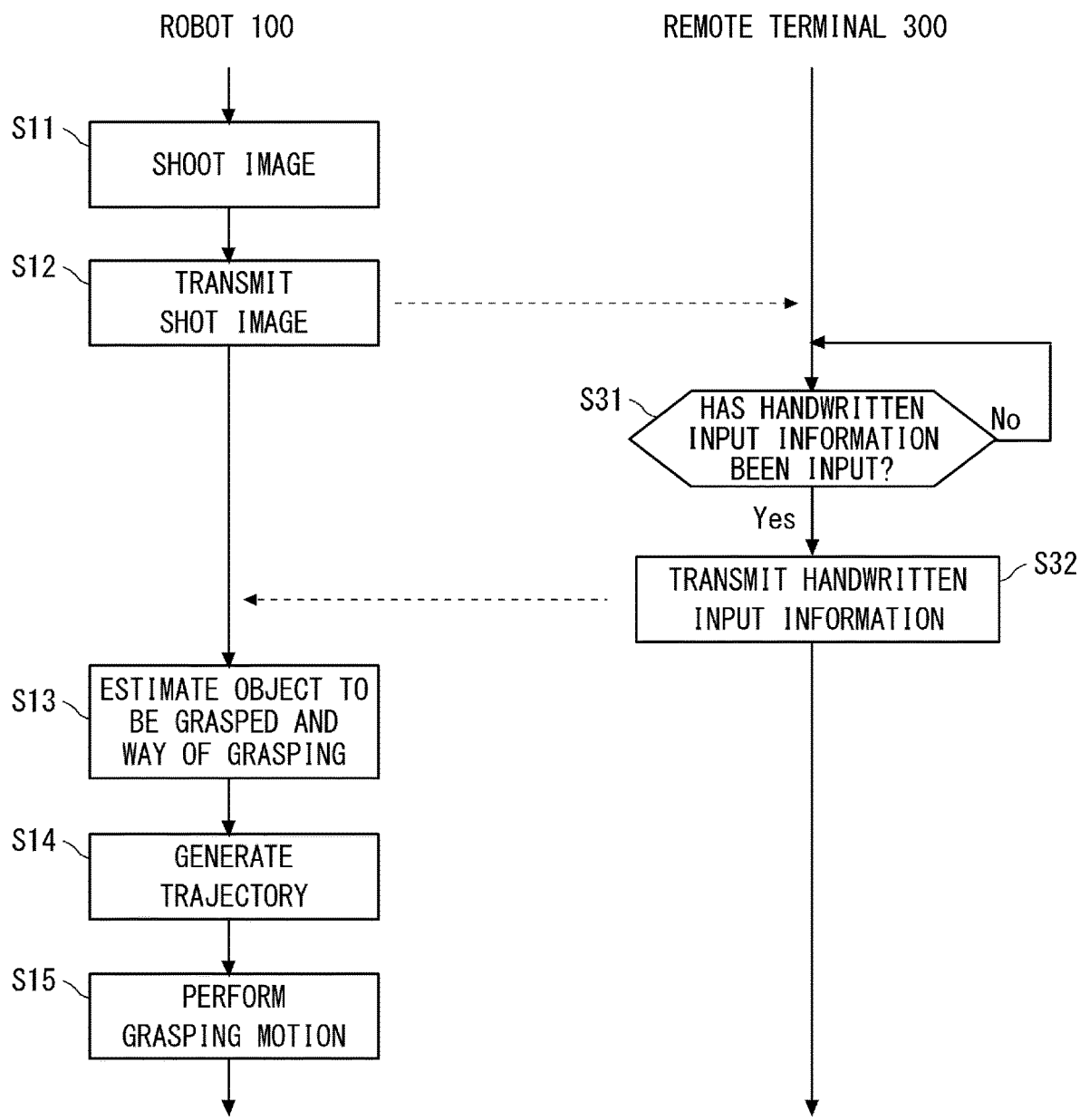
FIG. 14 is a flowchart showing an example of an overall flow of processes performed by the remote control system according to the embodiment.

Next, an overall description is given of processes performed by the remote control system 10 according to this embodiment. FIG. 14 is a flowchart showing an example of an overall flow of the processes performed by the remote control system 10 according to this embodiment. The flow on the left side thereof represents a flow of processes performed by the robot 100, and the flow on the right side thereof represents a flow of processes performed by the remote terminal 300. Further, exchanges of handwritten input information and a shot image via the system server 500 are indicated by dotted-line arrows.

The control unit 150 of the robot 100 causes the stereo camera 131 to shoot the first environment in which the robot 100 is located (Step S11), and transmits the shot image to the remote terminal 300 via the communication unit 190 (Step S12).

When the calculation unit 350 of the remote terminal 300 receives the shot image from the robot 100 via the communication unit 390, the calculation unit 350 displays the received shot image on the display panel 341. After that, the calculation unit 350 causes the display panel 341 to transit to a state in which handwritten input information to the shot image can be received (Step S31). When a user inputs handwriting input information to the shot image via the input unit 342 which is a touch panel (Yes in Step S31), the calculation unit 350 transmits the handwriting input information to the robot 100 via the communication unit 390 (Step S32).

When the recognition unit 151 of the robot 100 receives the handwritten input information which a user has input to the shot image from the remote terminal 300, the recognition unit 151 recognizes objects that can be grasped based on this shot image. The estimation unit 152 of the robot 100, based on the objects that can be grasped which the recognition unit 151 has recognized from the shot image and handwritten input information which a user has input to the shot image, estimates an object to be grasped which has been requested to be grasped by the hand 124 from among the objects that can be grasped which the recognition unit 151 has recognized and estimates a way of performing a grasping motion by the hand 124, the grasping motion having been requested to be performed with regard to the estimated object to be grasped (Step S13).

After that, the control unit 150 of the robot 100 controls the movable-base drive unit 145 so as to move the robot 100 to the vicinity of the object to be grasped, and when the robot 100 has been moved to the vicinity of the object to be grasped, the control unit 150 generates a trajectory of the hand 124 for enabling the grasping motion that has been requested to be performed with regard to the object to be grasped (Step S14). When the control unit 150 has generated a trajectory of the hand 124, the control unit 150 controls the upper-body drive unit 146 in accordance with the generated trajectory, whereby the grasping motion is performed by the hand 124 to the object to be grasped (Step S15).

Figure 15:
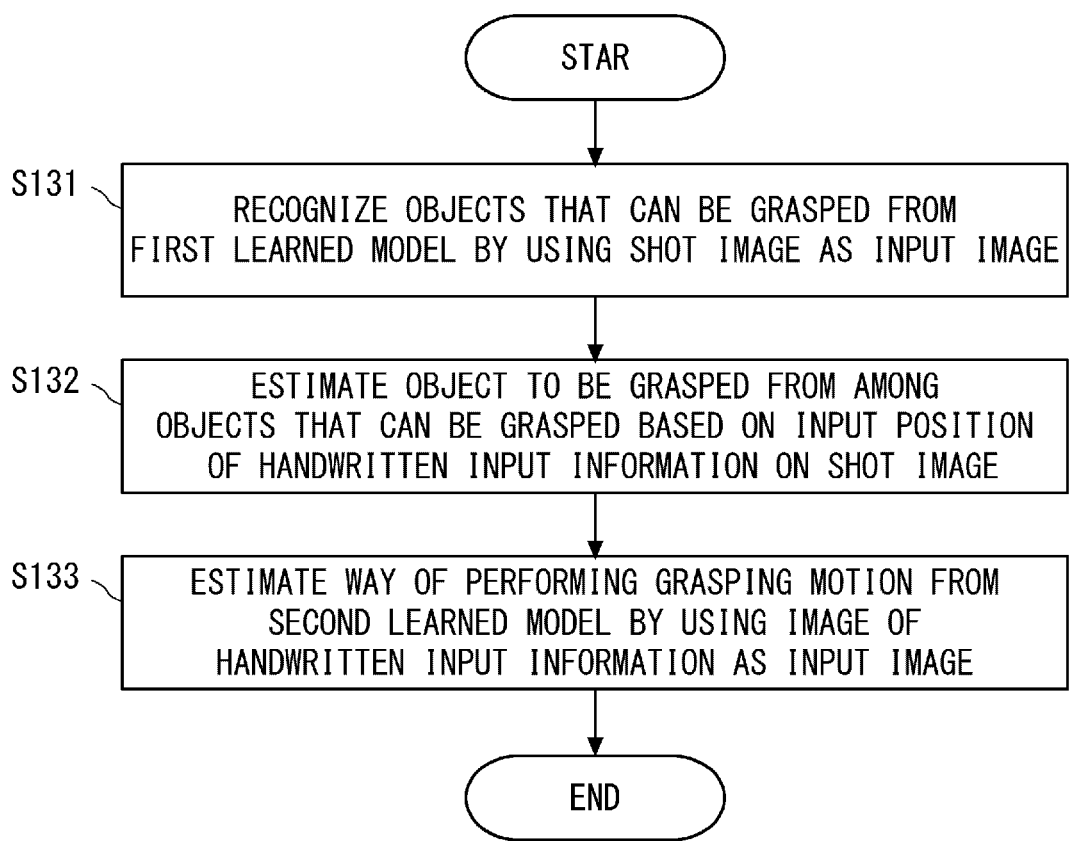
FIG. 15 is a flowchart showing an example of a detailed flow of processes performed in Step S13 of FIG. 14.

Next, processes performed in Step S13 of FIG. 14 are described in detail. FIG. 15 is a flowchart showing an example of a detailed flow of the processes performed in Step S13 of FIG. 14 by the robot 100. When handwritten input information which a user has input to a shot image is received from the remote terminal 300, the recognition unit 151 first uses the shot image as an input image, obtains areas that can be grasped shown in the shot image from the first learned model 181 read from the memory 180, and recognizes objects that can be grasped (Step S131).

Next, the estimation unit 152 estimates an object to be grasped which has been requested to be grasped by the hand 124 from among the objects that can be grasped which the recognition unit 151 has recognized based on the input position of the handwritten input information on the shot image (Step S132). Note that the input position of the handwritten input information on the shot image may be recognized by using, for example, a method similar to that described above.

Next, the estimation unit 152 uses an image of the handwritten input information as an input image, obtains the meaning of a grasping motion simulated by this handwritten input information from the second learned model 182 read from the memory 180, and estimates a way of performing a grasping motion by the hand 124, the grasping motion having been requested to be performed with regard to the object to be grasped (Step S133).

As described above, according to this embodiment, the recognition unit 151 recognizes objects that can be grasped by the hand 124 based on a shot image of the environment in which the robot 100 is located. The estimation unit 152, based on the objects that can be grasped which the recognition unit 151 has recognized from the shot image and handwritten input information which a user has input to the shot image, estimates an object to be grasped which has been requested to be grasped by the hand 124 from among the objects that can be grasped and estimate a way of performing a grasping motion by the hand 124, the grasping motion having been requested to be performed with regard to the estimated object to be grasped.

By this configuration, it is possible to have the robot 100 perform a grasping motion by a remote control without the need for a user to recollect predetermined instruction figures and input them by handwriting. Thus, it is possible to implement the remote control system 10 that enables a more intuitive operation.

Note that the present disclosure is not limited to the above-described embodiment and can be modified as appropriate without departing from the spirit of the present disclosure.

Figure 16:
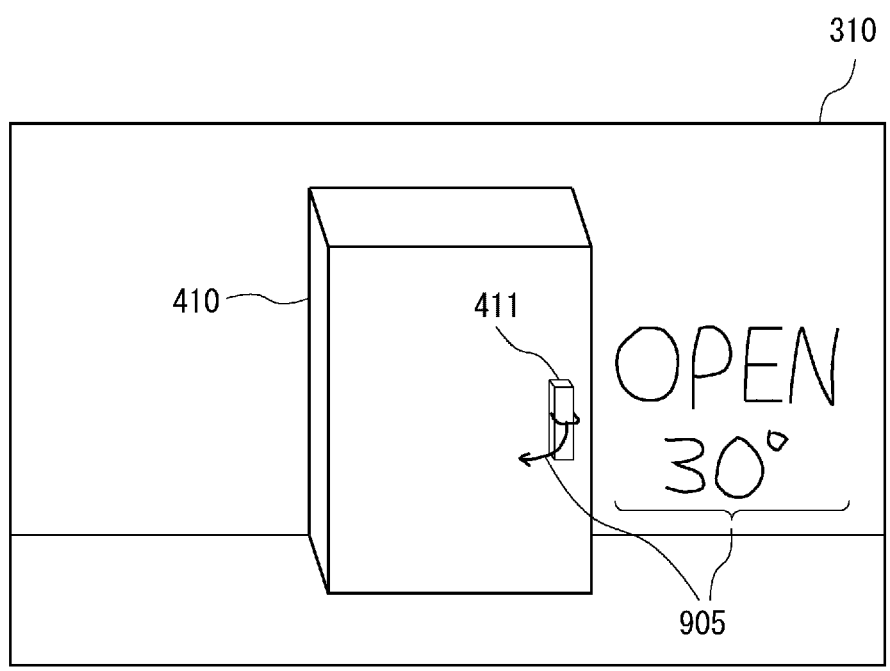
FIG. 16 shows an example of handwritten input information.

For example, in the above-described embodiment, handwritten input information is an image that simulates a way of performing a grasping motion by the hand 124, the grasping motion having been requested to be performed with regard to the object to be grasped, but this is merely an example. The handwritten input information may further include an image that shows a level of the grasping motion. In this case, the estimation unit 152 may further estimate a level of the grasping motion that has been requested to be performed with regard to the object to be grasped based on the handwritten input information. FIG. 16 is a diagram showing an example of handwritten input information including an image that shows a level of the grasping motion. The example shown in FIG. 16 shows handwritten input information 905 in which an image of "30°" showing the level of the grasping motion is added to an image similar to the handwritten input information 903 of FIG. 5. In the case of the example shown in FIG. 16, the estimation unit 152 estimates that a grasping motion which has been requested to be performed with regard to the knob 411 is a motion for holding the knob 411 and then opening the door by 30°. This configuration enables a user to perform a more detailed and intuitive operation.

Figure 17:
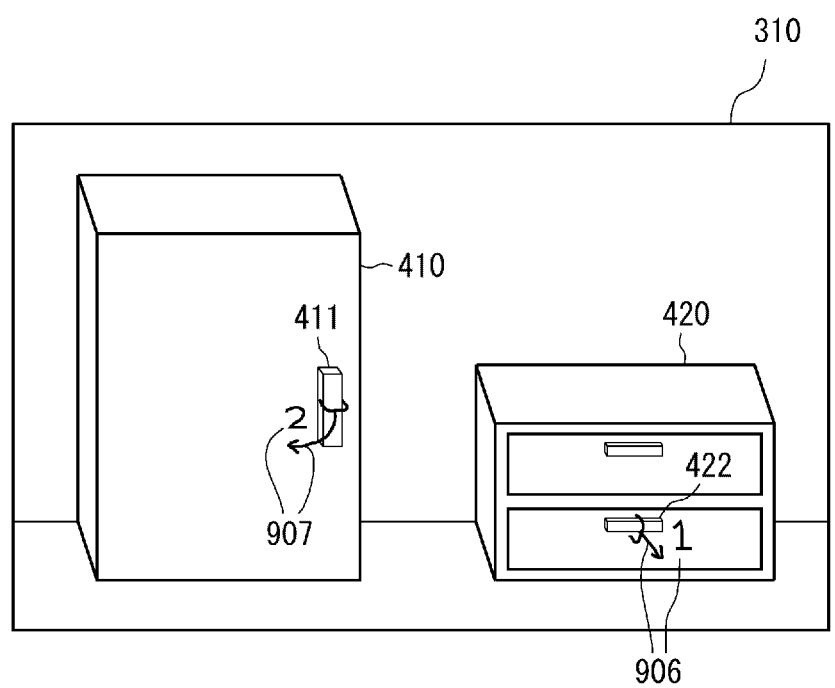
FIG. 17 is a diagram showing an example in which a plurality of handwritten input information pieces are input.

Further, in the above-described embodiment, an example in which one piece of handwritten input information is input to the shot image has been described, but this is merely one example. A plurality of handwritten input information pieces may be input to the shot image. When a plurality of handwritten input information pieces are input to the shot image, the estimation unit 152 estimates an object to be grasped and a way of performing a grasping motion for the respective plurality of handwritten input information pieces. At this time, the estimation unit 152 may estimate that the order of performing the grasping motions is the order in which the handwritten input information pieces corresponding to the grasping motions are input. Alternatively, each of the handwritten input information pieces may further include an image showing the order of performing the grasping motions, and the estimation unit 152 may further estimate the order of performing the grasping motions based on these handwritten input information pieces. FIG. 17 is a diagram showing an example in which a plurality of handwritten input information pieces, each of which includes an image showing the order of performing the grasping motions, have been input. FIG. 17 shows an example in which two pieces of handwritten input information of handwritten input information 906 for the knob 422 and handwritten input information 907 for the knob 411 are input to the shot image 310. Here, the handwritten input information 906 includes an image of "1" showing the order of performing the grasping motions, and the handwritten input information 907 includes an image of "2" showing the order of performing the grasping motions. Therefore, in the case of the example shown in FIG. 17, the estimation unit 152 estimates that the grasping motion (the motion for holding the knob 422 and then opening the drawer) which has been requested to be performed with regard to the knob 422 is performed first and the grasping motion (the motion for holding the knob 411 and then opening the door) which has been requested to be performed with regard to the knob 411 is performed second.

Further, in the above-described embodiment, two learned models of the first and the second learned models 181 and 182 are used, but this is merely an example. Instead of using the first and the second learned models 181 and 182, a transfer learned model in which the output of the first learned model 181 is applied to the second learned model 182 may be used. The transfer learned model is, for example, a model that uses a shot image in which handwritten input information has been input as an input image and outputs objects that can be grasped shown in the shot image, an object to be grasped among the objects that can be grasped, and the meaning of a grasping motion that is simulated by the handwritten input information and is performed with regard to the object to be grasped.

Further, in the above-described embodiment, the robot 100 includes the recognition unit 151 and the estimation unit 152, but this is merely an example. The recognition unit 151 and the estimation unit 152 may be included in the remote terminal 300 or in the system server 500.

Further, in the above-described embodiment, the robot 100 and the remote terminal 300 exchange a shot image and handwritten input information via the Internet 600 and the system server 500, but this is merely an example. The robot 100 and the remote terminal 300 may exchange a shot image and handwritten input information by direct communication.

Further, in the above-described embodiment, the imaging unit (the stereo camera 131) included in the robot 100 is used, but this is merely an example. The imaging unit may be any imaging unit provided at any place in the first environment in which the robot 100 is located. Further, the imaging unit is not limited to a stereo camera and may be a monocular camera or the like.

Further, in the above-described embodiment, the example in which the device to be operated is the robot 100 including the hand 124 at the tip of the arm 123 as an end effector has been described, but this is merely one example. The device to be operated may be any object including an end effector and performing a grasping motion by using the end effector. Further, the end effector may be a grasping part (e.g., a suction part) other than a hand. Further, in the above-described embodiment, it has been described that in the robot 100 and the remote terminal 300, the CPU executes the control program read from the memory, thereby performing control and calculation processes. In the system server 500, like in the robot 100 and the remote terminal 300, the CPU may also execute the control program read from the memory, thereby performing control and calculation processes.

In the above-described examples, the program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media.

Examples of transitory computer readable media include electric signals, optical signals, and electromagnetic waves. Transitory computer readable media can provide the program to a computer via a wired communication line (e.g., electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A remote control system configured to remotely control a device to be operated comprising an end effector, the remote control system comprising:
   an imaging unit configured to shoot an environment in which the device to be operated is located;
   a processor programmed to function as:
      a recognition unit configured to recognize objects that can be grasped by the end effector based on a shot image of the environment shot by the imaging unit;
      an estimation unit configured to, based on the objects that can be grasped which the recognition unit has recognized and the handwritten input information input to the shot image, estimate an object to be grasped which has been requested to be grasped by the end effector from among the objects that can be grasped and estimate a way of performing a grasping motion by the end effector, the grasping motion having been requested to be performed with regard to the object to be grasped,
      wherein the estimation unit further estimates a level of the grasping motion which has been requested to be performed with regard to the object to be grasped based on the objects that can be grasped which the recognition unit has recognized and the handwritten input information input to the shot image; and
      a performance unit configured to control the end effector to perform the grasping motion using a trajectory generated based upon the estimation by the estimation unit; and
   an operation terminal configured to display the shot image and receive handwritten input information input to the displayed shot image;
   wherein the object to be grasped is a knob for a drawer or a door knob of a door, and when the object to be grasped is the knob for the drawer, the grasping motion is a motion for holding the knob and then opening and closing the drawer, and when the object to be grasped is the door knob of the door, the grasping motion is a motion for holding the door knob and then opening and closing the door, and
   wherein the level of the grasping motion indicates a degree of opening of the drawer or the door.

2. The remote control system according to claim 1, wherein the handwritten input information includes the first image that simulates the way of performing the grasping motion with regard to the object to be grasped, and an image that shows the level of the grasping motion.

3. The remote control system according to claim 1, wherein the recognition unit obtains areas that can be grasped by a hand shown in the shot image obtained by the imaging unit, the areas being obtained from a first learned model that is a neural network learned from a combination of image showing objects that can be grasped by the hand and a correct answer to which area of the image is the object to be grasped, the areas being determined as areas that can be grasped.

4. A remote control method performed by a remote control system configured to remotely control a device to be operated comprising an end effector, the remote control method comprising:
   shooting an environment in which the device to be operated is located;
   receiving, by an operation terminal displaying a shot image of the environment, handwritten input information input to the displayed shot image;
   recognizing objects that can be grasped by the end effector based on the shot image;
   based on the objects that can be grasped and the handwritten input information input to the shot image, estimating an object to be grasped which has been requested to be grasped by the end effector from among the objects that can be grasped and estimating a way of performing a grasping motion by the end effector, the grasping motion having been requested to be performed with regard to the object to be grasped;
   estimating a level of the grasping motion which has been requested to be performed with regard to the object to be grasped based on the objects that can be grasped which the recognition unit has recognized and the handwritten input information input to the shot image; and
   controlling the end effector to perform the grasping motion using a trajectory generated based upon the estimating,
   wherein the object to be grasped is a knob for a drawer or a door knob of a door, and when the object to be grasped is the knob for the drawer, the grasping motion is a motion for holding the knob and then opening and closing the drawer, and when the object to be grasped is the door knob of the door, the grasping motion is a motion for holding the door knob and then opening and closing the door, and
   wherein the level of the grasping motion indicates a degree of opening of the drawer or the door.

5. A non-transitory computer readable medium storing a program for causing a computer to:
   recognize, based on a shot image of an environment in which a device to be operated comprising an end effector is located, objects that can be grasped by the end effector;
   based on handwritten input information input to the shot image displayed on an operation terminal and the objects that can be grasped, estimate an object to be grasped which has been requested to be grasped by the end effector from among the objects that can be grasped and estimate a way of performing a grasping motion by the end effector, the grasping motion having been requested to be performed with regard to the object to be grasped;
   estimate a level of the grasping motion which has been requested to be performed with regard to the object to be grasped based on the objects that can be grasped which the recognition unit has recognized and the handwritten input information input to the shot image; and
   control the end effector to perform the grasping motion using a trajectory generated based upon the estimating, wherein the object to be grasped is a knob for a drawer or a door knob of a door, and when the object to be grasped is the knob for the drawer, the grasping motion is a motion for holding the knob and then opening and closing the drawer, and when the object to be grasped is the door knob of the door, the grasping motion is a motion for holding the door knob and then opening and closing the door, and wherein the level of the grasping motion indicates a degree of opening of the drawer or the door.

* * * * *